US006916577B2

(12) United States Patent
Parent et al.

(10) Patent No.: US 6,916,577 B2
(45) Date of Patent: Jul. 12, 2005

(54) ALKALINE CELL WITH POLYMER ELECTROLYTE

(75) Inventors: C. Robert Parent, Westwood, MA (US); Jonathan M. Boulton, North Attleboro, MA (US); Radek Fooksa, Needham, MA (US)

(73) Assignee: The Gillette Company, Boston, MA (US)

( * ) Notice: Subject to any disclaimer, the term of this patent is extended or adjusted under 35 U.S.C. 154(b) by 534 days.

(21) Appl. No.: 10/209,223

(22) Filed: Jul. 31, 2002

(65) Prior Publication Data

US 2004/0023110 A1 Feb. 5, 2004

(51) Int. Cl.[7] .......................... H01M 6/04; H01M 4/42; H01M 4/50; H01M 10/26
(52) U.S. Cl. ....................... 429/206; 429/303; 429/224; 429/229; 429/246
(58) Field of Search ................................. 429/206, 224, 429/229, 303, 246, 249

(56) References Cited

U.S. PATENT DOCUMENTS

| | | |
|---|---|---|
| 4,140,659 A | 2/1979 | Clemens |
| 5,760,088 A | 6/1998 | Walker |

FOREIGN PATENT DOCUMENTS

EP          510239     * 10/1992

OTHER PUBLICATIONS

Peregudov, Y. et al., "Thermodynamic parameters of dilution and mixing of the solutions of poly(vinylbenzyltrimethylammonium) in various forms," Vysokomolekulyarnye Soedineniya, Seriya A i Seriya B, 40(7), 1224–1227, 1998 (no month), abstract.*

Matusevich, V., et al., "Electric conductivity of aqueous solutions of polyvinylbenzyltrimethylammonium hydroxide and salts," Vestsi Akademii Navuk BSSR, Seryya Khimichnykh Navuk, (3) 11–14, 1986 (no month), abstract.*

L. C. Hardy and D.F. Shriver, "Preparation and Electrical Response of Solid Polymer Electrolytes..", J. Am. Chem. Soc., (1985) vol. 107, p. 3823–3828.

E. Agel, J. Bouet, and J.F. Fauvarque, "Characterization and Use of Anionic Membranes for Alkaline Fuel Cells", Journal of Power Sources, (2001) vol. 101, p. 267–274.

E. Agel, J. Bouet, J. Fauvarque, and H. Yassir, "Utilization of Solid Polymer Electroyte", Ann. Chim. Sci. Mat. (2001), vol. 26(4), p. 59–68.

English language translation for: Eric Agel, J. Bouet, J.F. Fauvarque, and H. Yassir, Use of Solid Polymer Electrolyte in Alkaline Fuel Cells, Ann. Chim. Sci. Mat. 2001, vol. 26 (4), pp. 59–68.

* cited by examiner

*Primary Examiner*—Jonathan Crepeau
(74) *Attorney, Agent, or Firm*—Barry D. Josephs; Thomas G. Krivulka (57) ABSTRACT

An alkaline cell having an anode comprising zinc, a cathode comprising manganese dioxide and an electrolyte comprising polyvinylbenzyltrimethylammoniumhydroxide. The anode can comprise particulate zinc dispersed within an aqueous gel comprising crosslinked polyvinylbenzyltrimethylammoniumhydroxide polymer. Optionally, aqueous KOH can be added to the gel. The anode and cathode are desirably in the shape of a slab each having a pair of opposing parallel flat faces defining two opposing ends. The zinc particles dispersed in crosslinked polyvinylbenzytrimethylammoniumhydroxide polymer can be concentrated at one end of the anode slab with the opposing end being clear of zinc. The clear end of the anode preferably also comprising polyvinylbenzlytrimethylammoniumhydroxide functions as a separator between anode and cathode. The cathode slab comprises a mixture of particulate manganese dioxide, graphite, and linear polyvinylbenzyltrimethylammoniumhydroxide polymer. The polyvinylbenzyltrimethylammoniumhydroxide polymer functions to bind the manganese dioxide particles and also functions as electrolyte during cell discharge.

32 Claims, 2 Drawing Sheets

ALKALINE CELL WITH POLYMER ELECTROLYTE

FIELD OF THE INVENTION

This invention relates to an alkaline cell with a polyelectrolyte comprising polyvinylbenzyltrimethylammonium hydroxide.

BACKGROUND OF THE INVENTION

Conventional alkaline electrochemical cells have an anode comprising zinc and a cathode comprising manganese dioxide. The cell is typically formed of a cylindrical casing. The casing is initially formed with an enlarged open end and opposing closed end. After the cell contents are supplied, an end cap with insulating plug is inserted into the open end. The cell is closed by crimping the casing edge over an edge of the insulating plug and radially compressing the casing around the insulating plug to provide a tight seal. A portion of the cell casing at the closed end forms the positive terminal. The cell casing may also be in the form of a button cell or have a flat housing, for example, of rectangular or prismatic shape.

Primary alkaline electrochemical cells typically include a zinc anode active material, an alkaline electrolyte, a manganese dioxide cathode active material, and an electrolyte permeable separator film, typically of cellulose or cellulosic and polyvinylalcohol fibers. The term anode active material or cathode active material as used herein shall mean material within the anode or cathode, respectively, which undergoes useful electrochemical reaction upon cell discharge. The anode active material can include for example, zinc particles admixed with conventional gelling agents, such as sodium carboxymethyl cellulose or the sodium salt of an acrylic acid copolymer, and an electrolyte. The gelling agent serves to suspend the zinc particles and to maintain them in contact with one another. Typically, a conductive metal nail inserted into the anode active material serves as the anode current collector, which is electrically connected to the negative terminal end cap.

The electrolyte can be an aqueous solution of an alkali metal hydroxide for example, potassium hydroxide, sodium hydroxide or lithium hydroxide. An electrolyte comprising an aqueous solution of potassium hydroxide is more conventionally employed. The cathode typically includes particulate manganese dioxide as the electrochemically active material admixed with an electrically conductive additive, typically graphite material, to enhance electrical conductivity. Optionally, small amounts of polymeric binders, for example polyethylene binder and other additives, such as titanium-containing compounds can be added to the cathode.

The manganese dioxide used in the cathode is preferably electrolytic manganese dioxide (EMD) which is made by direct electrolysis of a bath of manganese sulfate and sulfuric acid. The EMD is desirable since it has a high density and high purity. The electrical conductivity of EMD is fairly low. An electrically conductive material is added to the cathode mixture to improve the electric conductivity between individual manganese dioxide particles. Such electrically conductive additive also improves electric conductivity between the manganese dioxide particles and the cell housing, which also serves as cathode current collector. Suitable electrically conductive additives can include, for example, conductive carbon powders, such as carbon blacks, including acetylene blacks, flaky crystalline natural graphite, flaky crystalline synthetic graphite, including expanded or exfoliated graphite. The resistivity of graphites such as flaky natural or expanded graphites can typically be between about $3 \times 10^{-3}$ ohm-cm and $4 \times 10^{-3}$ ohm-cm.

It is desirable for a primary alkaline battery to have a high discharge capacity (i.e., long service life) and be capable of powering flashlights, radios, portable audio players and other electronic devises operating at running voltage between about 0.8 and 1.5 Volts. It is desirable for alkaline cells to be suitable for higher power application, e.g. between about 500 and 1000 mAmp. However, there is also a need for special purpose alkaline cells to power electronic devices such as LED calculators, radios, and some electronic games, which operate at lower drain rates, for example, between about 1 and 500 mAmp. Since commercial cell sizes have been fixed, it is known that the useful service life of a cell can be enhanced by packing greater amounts of the electrode active materials into the cell. However, such approach has practical limitations such as, for example, if the electrode active material is packed too densely in the cell, the ionic conductivity can be reduced, in turn reducing service life. Other deleterious effects such as cell polarization can occur as well. Polarization limits the mobility of ions within both the electrolyte and the electrodes, which in turn degrades cell performance and service life. Although the amount of active material included in the cathode typically can be increased by decreasing the amount of non-electrochemically active materials such as polymeric binder or conductive additive, a sufficient quantity of conductive additive must be maintained to ensure an adequate level of bulk conductivity in the cathode. Thus, the total active cathode material is effectively limited by the amount of conductive additive required to provide an adequate level of conductivity.

Although such alkaline cells are in widespread commercial use the aqueous electroyte, typically comprising an aqueous solution of potassium hydroxide, requires that the cell be tightly sealed to prevent leakage of the aqueous electrolyte therefrom. The alkaline cells typically produces gassing during discharge or storage which can raise the internal pressure of the cell to elevated pressures which can reach relatively high levels, for example, of between about 600 and 1500 psia. At such internal gas pressures the casing edge at the open end of the cell casing must be tightly crimped around special end cap sealing assemblies in order to close the cell and prevent the aqueous electrolyte from leaking therefrom. The end cap assembly which typically employs an insulating disk or plug (insulating grommet) and a radially compressible end cap, or additional support disk between end cap and insulating disk, is designed to withstand high radial crimping forces necessary to provide a tight seal. Such end cap assemblies while providing a tight seal to prevent leakage of the aqueous electrolyte, nevertheless consume a significant amount of the cell's internal volume thereby reducing the amount of useable volume for anode and cathode active materials.

It would be desirable to replace the conventional alkaline aqueous electrolyte in such cells with a polymer electrolyte system which is non flowable or at least more viscous and less flowable and requires less free water than the conventional aqueous potassium hydroxide electrolyte. It would be even more desirable if the polymer electrolyte system contained little, if any free water. Such electrolyte has the distinct advantage that it would significantly reduce the sealing requirements of the cell. Such polymer electrolyte would thus markedly reduce the thickness of the end cap assembly. It could eliminate the need for conventional end cap assemblies which normally employs additional components, such as radially compressible support disks, to provide a tight seal preventing leakage of the aqueous electrolyte. In turn the amount of the cell's internal volume available for anode and cathode active materials would be increased.

It would be desirable to offer the consumer alkaline cells with a prismatic form factor that could better fit within new thin consumer products, such as cell phones, PDAs, etc. A polyelectrolyte would offer a number of advantages to a prismatic form factor alkaline cell. Prismatic cells can contain much less gas pressure without bulging than can cylindrical cells. Therefore, prismatic cells require a gas vent, and it is clearly easier to make a leakage proof gas vent if the electrolyte is not a liquid and cannot flow. The ability to fabricate thin self-supporting polyelectrolyte films and the adhesive nature of the polyelectrolyte also opens the possibility of high-speed, continuous, low-cost cell assembly by a lamination process.

SUMMARY OF THE INVENTION

A principal aspect of the invention is the use of a polyelectrolyte preferably comprising polyvinylbenzyltrimethylammonium hydroxide as the electrolyte for an alkaline cell. The polyvinybenzyltrimethylammonium hydroxide (PVBTMAOH) may form part of the anode and cathode and optionally the cell's separator, for an alkaline cell. The alkaline cell desirably has an anode comprising zinc and a cathode comprising manganese dioxide. The polyvinybenzyltrimethylammonium hydroxide (PVBTMAOH) is a hydrogel (aqueous gel), containing a significant weight fraction (30–75 wt %) of water which is bound within the hydrogel. The hydrogel characteristics are more pronounced when the polyvinybenzyltrimethylammonium hydroxide (PVBTMAOH) polymer is crosslinked. Potassium hydroxide (KOH) or other alkaline need not be added to the electrolyte comprising polyvinylbenzyltrimethylammonium hydroxide (PVBTMAOH). Optionally, aqueous KOH can be added to the electrolyte so that dissolved KOH in the electrolyte comprises between about 0 and 2 moles KOH per mole monomer unit of the polyvinybenzyltrimethylammonium hydroxide (PVBTMAOH). The electrolyte thus comprises between about 0 and 2 moles KOH, desirably between about 0.5 and 2.0 moles KOH, typically about 1.6 moles KOH per monomer unit of the polyvinybenzyltrimethylammonium hydroxide (PVBTMAOH).

A principal aspect of the invention is directed to an alkaline cell employing a polyelectrolyte such as polyvinylbenzyltrimethylammonium hydroxide (PVBTMAOH) and an anode comprising zinc. The alkaline cell desirably comprises a cathode comprising particulate manganese dioxide. The manganese dioxide is preferably electrolytic manganese dioxide. The term alkaline cell as used herein shall mean an electrochemical cell comprising an electrolyte containing hydroxyl groups or hydroxyl ions ($OH^-$) therein.

In an aspect of the invention the alkaline cell anode is formed by gelling particulate zinc with cross-linked polyvinylbenzyltrimethylammonium hydroxide (PVBTMAOH) to form a gelled anode with particulate zinc held suspended therein by the polymer electrolyte. The gelled anode can be formed by pouring zinc powder into a cavity, for example, of cylindrical or disk shape and then adding vinylbenzytrimethylammonium hydroxide (VBTMAOH) monomer, initiator and crosslinking agent. The temperature is elevated to the required level to effect polymerization and crosslinking thus forming a gelled polyvinylbenzyltrimethylammonium hydroxide (PVBTMAOH) polymer gel. In such embodiment the zinc desirably occupies a distinct portion of the gelled polymer electrolyte. Preferably, the particulate zinc is suspended or dispersed within a major portion (more than 25%) of the total polymer gel volume. For example, if the gelled polymer electrolyte is in the form of cylindrical column or disk, the particulate zinc can lie suspended primarily near one end or at the bottom of such column or disk with the remainder volume of the column or disk being clear polymer electrolyte, that is, being devoid of zinc. The cathode can be placed in juxtaposition against the clear portion of the polymer electrolyte polyvinylbenzyltrimethylammonium hydroxide (PVBTMAOH) of the anode. In such embodiment the clear portion of the polymer electrolyte gel will also function as an electrolyte permeable separator. Thus, in this aspect of the invention the separator is an integral part of the anode.

Alternatively, the anode can be formed of a sheet of zinc of any desired overall shape and a clear polymer gelled electrolyte comprising polyvinylbenzyltrimethylammoniumhydroxide (PVBTMAOH) of similar shape can be placed so that one of its sides rests against the zinc sheet. In this case the polymer electrolyte (PVBTMAOH) itself is preferably clear, that is, does not contain any zinc. The cathode can then be placed in juxtaposition against the opposite side of the polymer electrolyte so that the polymer electrolyte is between anode and cathode. In such embodiment the gelled polymer electrolyte functions as an electrolyte permeable separator between anode and cathode. The separator is preferably formed of crosslinked polyvinylbenzyltrimethylammonium hydroxide (PVBTMAOH).

The cathode is desirably formed of a physical mixture comprising particulate $MnO_2$, a conductive carbon, preferably particulate graphite or graphitic material, and linear polymer polyvinylbenzyltrimethylammonium hydroxide (PVBTMAOH). The linear PVBTMAOH is soluble in water to from a viscous solution in contrast to the crosslinked PVBTMAOH which is water swellable to form a rubbery polymer, but is not water soluble. The linear PVBTMAOH is, therefore, preferred in forming an intimately mixed cathode mixture. The linear PVBTMAOH itself can be prepared by forming a mixture of vinylbenzyltrimethylammonium hydroxide (VBTMAOH) monomer, water and azo free radical initiator and then raising the mixture to the required temperature, to effect the polymerization.

In the aspect of the invention wherein the anode comprises particulate zinc, the bulk density of the anode is desirably between about 2.5 and 3.5 grams zinc per cubic centimeter of anode volume. The total anode volume is defined as including the portion with particulate zinc dispersed within the gelled polymer electrolyte (PVBTMAOH) and also any clear portion, that is, devoid of zinc. The thickness of cathode comprising the mixture of particulate $MnO_2$, graphite and linear polymer polyvinylbenzyltrimethylammoniumhydroxide (PVBTMAOH) is desirably between about 0.5 and 5.0 mm. Enough surface area for anode and cathode is provided so that the current density (current drain divided by anode/cathode interface area) is desirably between about 1 and 10 milliAmp/$cm^2$. The alkaline cell of the invention has the greatest utility for current drain between about 1 and 500 mAmp, more typically between about 1 and 100 mAmp at voltage requirements between about 0.5 and 1.5 Volts.

The alkaline cell of the invention comprising polyvinylbenzyltrimethylammonium hydroxide (PVBTMAOH) preferably contains zero added mercury (less than 50 parts mercury per million parts total cell weight, preferably less than 10 parts mercury per million parts total cell weight).

DETAILED DESCRIPTION

Figure 1:
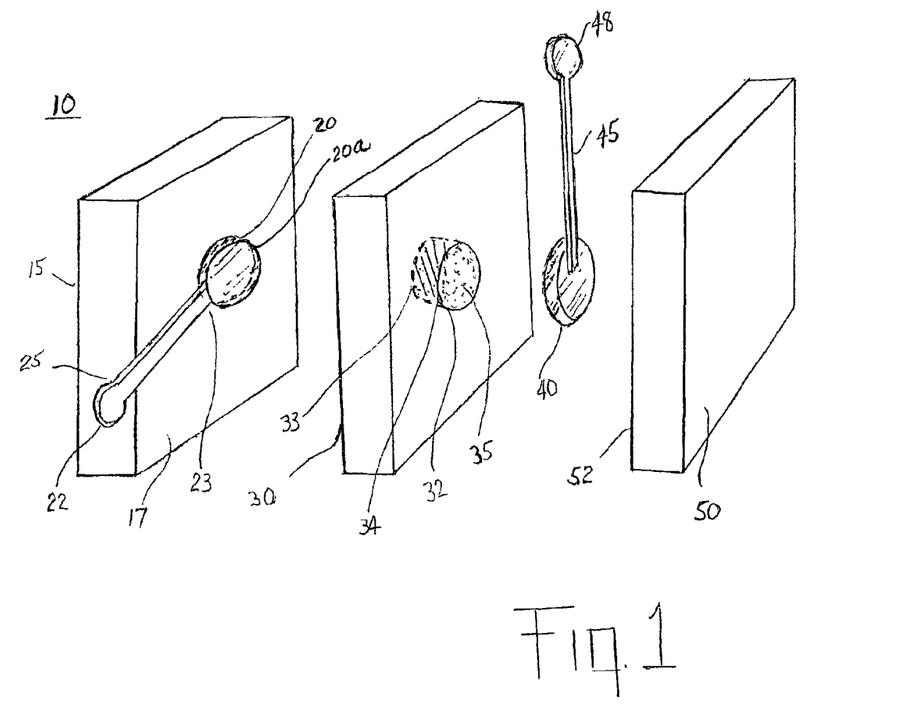
FIG. 1 is an exploded view of an embodiment of a test cell with a sheet of zinc as anode in contact with the polymer electrolyte of the invention.

An embodiment of test cell 10 is illustrated in the exploded view of the components shown in FIGS. 1. The cell 10 shown in FIG. 1 comprises an electrically insulating block 15, preferably comprising a durable plastic. Preferably block 15 can be formed of a wide range of plastic materials including polyethylene, polypropylene, polystyrene, nylon and polycarbonate. As shown in FIG. 1, anode 20 is formed of a sheet of zinc 20a centrally located on the inside surface 17 of insulating block 15. Zinc sheet 20a may be of any shape, but preferably is of a circular disk configuration as shown in FIG. 1. The sheet of zinc 20a desirably has a thickness between about 0.1 and 0.5 mm. A conductive metallic strip 25 functioning as an anode current collector is secured to zinc sheet 20a preferably by spot welding end 23 to the edge or underside of zinc sheet 20a. The current collector 25 terminates at its opposite end in an integrally formed tab 22 which forms the cell's negative terminal. Zinc sheet 20a may be held in place on insulating block 15 by a thin coat of adhesive on the portion of insulating block surface 17 to which the zinc sheet 20a is applied.

A holding block 30 is provided with a cavity 32 running completely therethrough at the center of the block. Holding block 30 man be formed of a variety of electrically insulating materials. Preferably block 30 is formed of an alkaline resistant plastic material, preferably plastic materials such as polyethylene, polypropylene, or nylon. Cavity 32 is desirably of a shape and diameter approximately matching that of zinc sheet 20. Conveniently the cavity 32 is of a cylindrical shape having a diameter slightly smaller than the diameter of zinc sheet 20a. Thus, when the electrolyte holding block 30 is pressed onto insulating block 15, zinc sheet 20a will penetrate into the outer end 33 of electrolyte cavity 32. Desirably the cavity 32 can then be filled with a monomer mixture, preferably comprising vinylbenzyltrimethylammonium hydroxide (VBTMAOH). The monomer mixture comprises an initiator and crosslinking agent. As the temperature is elevated to the required temperature the monomer polymerizes and becomes crosslinked to form the gelled polyvinylbenzyltrimethylammoniumhydroxide (PVBTMAOH) electrolyte 35. As shown in FIG. 1 the crosslinked polymer PVBTMAOH completely occupies the cavity 32 so that it comes into contact with zinc sheet 20a which penetrates into the cavity 32 outer end 33. In the embodiment shown in FIG. 1 the clear polymer electrolyte 35 polyvinylbenzyltrimethylammonium hydroxide (PVBTMAOH) in cavity 32 serves as electrolyte and also functions as separator between anode 20 and cathode 40. The polymer electrolyte (separator) 35 has a thickness desirably between about 0.1 and 5.0 mm, preferably between about 0.1 and 1.0 mm. The gelled polymer electrolyte 35 is non-flowable and as such reduces the chance of electrolyte leakage from the cell even when the internal pressure of the cell increases during gas buildup within the cell during storage or discharge. The use of the gelled polymer electrolyte (PVBTMAOH) 35 of the invention has the advantage of eliminating the need for conventional aqueous alkaline electrolyte, typically an aqueous solution of potassium hydroxide which is prone to leakage from the cell.

Figure 2:
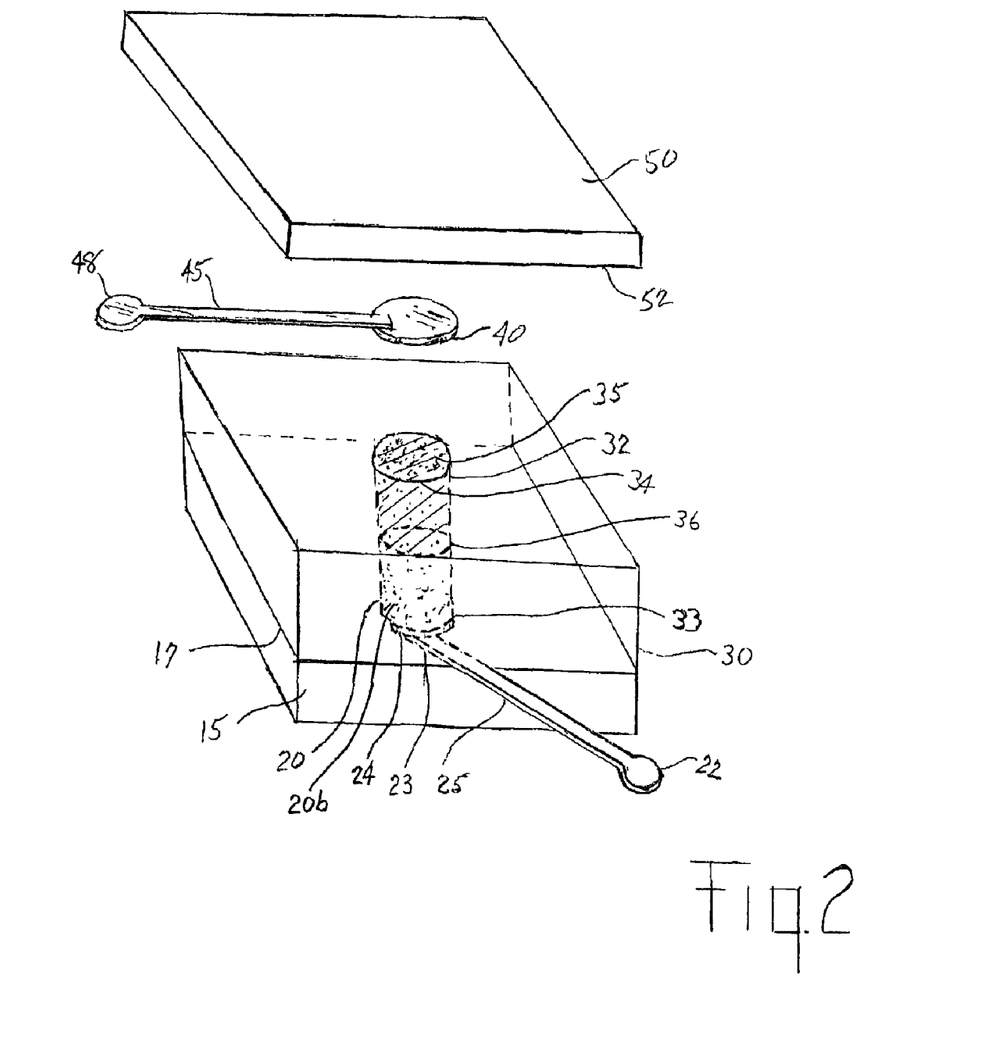
FIG. 2 is an exploded view of an embodiment of a test cell with particulate zinc as anode dispersed within a portion of a column of the polymer electrolyte of the invention.

Instead of a sheet of zinc for anode 20 particulate zinc 20b may be used in the test cell 10 as shown best in FIG. 2. The anode 20 can desirably be in the shape of a slab or disk. The particulate zinc can be pure zinc or an alloy of zinc (at least 99.9 wt. % zinc and alloy metal). For example, the zinc can be at least 99.9 percent zinc powder alloyed with 200 ppm indium. It shall be understood that the term zinc as used herein shall include such zinc alloy powder, since the alloy powder is composed almost entirely of zinc and discharges electrochemically as zinc. The zinc particles desirably have an average particle size between about 1 and 350 micron. The term average as used herein, unless otherwise specified, shall be understood to be the arithmetic average. The particulate zinc can be in the form of zinc fines having an average particle size less than about 60 micron, desirably between about 1 and 60 micron can enhance conductivity within the anode and thus enhance cell performance. Additionally, the particulate zinc can be in the form of or include zinc fibers. Such zinc fibers shall mean elongated strands of zinc having length to diameter ratio greater than 4, typically greater than 8. The length to diameter ratio of the zinc fibers can be much higher, for example, greater than 100 or more. Such zinc fibers can desirably have an average diameter less than about 0.2 mm. Preferably the average diameter of the zinc fibers are between about 0.1 and 0.02 mm. The zinc fines can enhance conductivity within the anode 20 and thus improve cell performance. The zinc fines can be used alone as anode active material or in admixture with other particulate zinc.

In the embodiment shown in FIG. 2 insulating block 15 and anode/electrolyte holding block 30 are arranged vertically with the block 30 on top. The holding block 30 is thus placed onto the insulating block 15 with anode current collector strip 25 therebetween. Particulate zinc 20b is then poured into cavity 32 through open end 34 so that it forms a layer at the bottom of cavity 32 against surface 17 of insulating block 15. Desirably, cavity 32 is then filled with a mixture comprising vinylbenzyltrimethylammonium hydroxide (VBTMAOH) monomer, azo free radical initiator, and crosslinking agent. The monomer mixture 35 is then poured into cavity 32 until it fills the cavity. The result is a column of monomer mixture with a portion thereof having particulate zinc suspended therein that is, at the bottom of the column between end 33 and interface 36. The remainder of the cavity 32 (between open end 34 and interface 36) is occupied by clear monomer solution, that is, without any zinc dispersed therein. The monomer mixture can then be polymerized and crosslinked by raising the temperature of the mixture to the required polymerization temperature to form a continuous gel between opposing ends 33 and 34 of cavity 32. The result is an anode comprising particulate zinc dispersed at the bottom of a column or disk shaped cavity 32 and entrapped in a gel of the polymerized and crosslinked PVBTMAOH electrolyte between end 33 and interface 36. The portion of the anode above the dispersed zinc, that is, between interface 36 and end 34 of cavity 32 is occupied by clear crosslinked PVBTMAOH electrolyte polymer devoid of any zinc. This clear portion of the PVBTMAOH (between interface 36 and end 34) also functions as electrolyte permeable separator between the particulate zinc 20b and cathode 40. The volume of the clear portion of the PVBTMAOH electrolyte (between interface 36 and 34) should be minimized (consistent with maintaining separation of the anode and cathode materials) since it contains no electrochemically active material. This volume can also contain a conventional battery separator membrane. The total anode 20 volume is defined herein as including the portion with particulate zinc dispersed within the gelled polymer electrolyte (PVBTMAOH) (between end 33 and interface 36) and also any clear portion, that is, devoid of zinc (between interface 36 and end 34.

As shown in FIG. 2 there is a conductive tab 24 protruding from end 23 of anode current collector 25. The conductive tab 24 can be an integral part of the current collector 25. Tab 24 is positioned so that it is in electrical contact with the zinc particles 20b. The current collector 25 is thereby in electrical contact with the particulate zinc and forms the cell's negative terminal at opposite end 22.

The cell 10 having an anode 20 comprising particulate zinc 20b (FIG. 2) preferably contains zero added mercury (less than 50 parts mercury per million parts total cell weight, preferably less than 10 parts mercury per million parts total cell weight) and modifications thereof. The cell 10 in this embodiment (FIG. 2) also preferably does not contain added amounts of lead and thus can be essentially lead free, that is, the total lead content is less than 30 ppm, desirably less than 15 ppm of total metal content of the anode 20.

A cathode slab (disk 40) is preferably a compacted physical mixture comprising battery grade manganese dioxide material (EMD), an electrically conductive additive, and linear polyvinylbenzyltrimethylammonium hydroxide (PVBTMAOH). The linear PVBTMAOH serves to bind the manganese dioxide particles and also functions as alkaline electrolyte during cell discharge. The average particle size of the $MnO_2$ particles can be readily controlled by grinding. Battery grade $MnO_2$ (EMD) is typically ground to a mean average particle size of between about 1 and 100 micron, desirably between about 10 and 50 micron, typically about 35 micron. The electrically conductive additive is desirably a conductive carbon, preferably graphite or graphitic material, to enhance electrical conductivity within the cathode. Such cathode disk 40 can be employed irrespective of whether the anode 20 comprises a sheet of zinc or particulate zinc. A cathode current collector formed of an electrically conductive metal strip 45, for example brass, is placed into contact with cathode disk 40.

In either embodiment (FIG. 1 or FIG. 2) after the anode 20 and cathode 40 have been formed, a metal clamping plate 50 (FIG. 1 and 2) is then pressed in place over the cathode disk 40 so that cathode disk 40 is pressed into contact with the exposed clear polymer electrolyte 35 within electrolyte cavity 32. A completed test cell 10 (FIG. 1 or FIG. 2) is thereby formed with protruding tab 22 forming the cell's negative terminal and the protruding cathode tab 48 forming the cell's positive terminal. The test cells of FIG. 1 and 2 are therefore essentially the same except that a strip of zinc 20a is employed as anode active material in contact with the gelled polymer electrolyte 35 as shown in FIG. 1 and zinc powder 20b is used as anode active material dispersed within the polymer electrolyte 35 as shown in FIG. 2.

The cathode 40 composition comprises $MnO_2$ (EMD) and graphite can be blended with varying amounts of the polymer PVBTMAOH, preferably linear PVBTMAOH along with preferably between about 4 and 10 percent by weight of graphite or graphitic material. The linear polymer PVBTMAOH advantageously comprises between about 1 and 10 wt. % of the total cathode. The linear polyvinylbenzyltrimethylammonium hydroxide (PVBTMAOH) is preferably present in the cathode in solution with water, and in any event the cathode may be considered an aqueous mixture. Such aqueous solution of linear polyvinylbenzyltrimethylammonium hydroxide (PVBTMAOH) and water desirably comprises between about 10 and 30 percent by weight of the total cathode, preferably between about 15 and 30 wt. % of the total cathode. The graphite or grapthitic material desirably comprises between about 4 and 10 wt. % of the cathode, desirably between about 4.6 and 8.9 wt. % of the cathode.

Thus, the $MnO_2$ in the cathode desirably comprises between about 60 and 86 per cent by weight of the cathode, desirably between about 70 and 86 wt. % of the cathode.

The term "graphite" or "graphitic material" as used herein shall include natural and synthetic crystalline graphites, expanded graphites, graphitic carbons, and graphitic carbon fibers. A graphitic carbon has the characteristics of an ordered three-dimensional graphite crystalline structure consisting of layers of hexagonally arranged carbon atoms stacked parallel to each other as determined by X-ray diffraction. As defined in International Committee for Characterization and Terminology of Carbon (ICCTC, 1982), published in the *Journal Carbon*, Vol. 20, p. 445 a graphitic carbon embraces the varieties of substances consisting of elemental carbon in allotropic form of graphite irrespective of structural defects. The term graphitic carbon as used herein shall be construed in this manner.

The term "expanded graphite" is a recognized term of art, for example, the form of graphite generally as referenced in U.S. Pat. No. 5,482,798. The expanded graphite is preferably in particulate form having a mean average particle size desirably between about 0.5 micron and 50 micron, typically between about 10 micron and 50 micron. Further, expanded graphite as used herein can be formed from natural and/or synthetic non-expanded graphite particles processed so as to have a uniaxially expanded crystal lattice. The extent of uniaxial expansion can be sufficiently large such that the expanded graphite particles can completely exfoliate (i.e., separate into thin laminae).

The term carbon fibers shall mean elongated strands of carbon having length to diameter ratio greater than 4, typically greater than 8. The length to diameter ratio of carbon fibers can be much higher, for example, greater than 100 or more.

In a principal application the cell of the invention has an overall cuboid (rectangular parallelepiped) shape. In such embodiment the outer surface of cell has a body surface which comprises two pair of opposing rectangular sides and a pair of opposing ends which are rectangular. Such cuboid shape is represented by the test cell 10 shown in FIGS. 1 and 2.

Preferred parameters for design of the cell are as follows:

In the embodiment wherein the particulate zinc is suspended within the gelled cross-linked polyvinylbenzyltrimethylammonium hydroxide (PVBTMAOH) polymer of the invention the bulk density of the anode is desirably between about 3.0 and 3.5 grams zinc per cubic centimeter of anode volume. The anode for the purposes of defining this bulk density parameter includes the total portion of polymer electrolyte within cavity 35 (FIG. 2), namely, between cavity ends 33 and 34. The thickness of the zinc filled portion of the anode, namely, between end 33 and interface 36 is desirably between about 1 and 5 mm, preferably between about 2 and 5 mm. The clear portion of the anode, namely the portion between end 34 and interface 36 (without any zinc dispersed therein) also functions as anode/cathode separator. The thickness of the clear portion of the anode between end 34 and interface 36 is desirably between about 0.1 and 5 mm, preferably between about 0.1 and 1 mm.

The thickness of cathode 40 (FIG. 2) comprising the mixture of particulate $MnO_2$, graphite and linear polymer polyvinylbenzyltrimethylammonium hydroxide (PVBTMAOH) is desirably between about 2 and 10 mm. Enough surface area at the anode/cathode interface is provided so that the current density (expected current drain divided by anode/cathode interface area) is desirably between about 1 and 10 $mA/cm^2$. The anode/cathode interface area is the defined as the common amount of area between facing anode and cathode surfaces. The discharge data obtained to date suggests that the alkaline cell of the invention employing the polyvinylbenzyltrimethylammonium hydroxide (PVBTMAOH) electrolyte in anode and cathode as above described, will have the greatest utility for applications requiring current drains between about 1 and 50 mA/cm$^2$, more typically between about 1 and 10 mA/cm$^2$ at voltage requirements between about 0.5 and 1.5 Volts. These are the anticipated preferred ranges of application and are not intended to exclude application at higher drains, for example, between about 50 mA/cm$^2$ and 200 mA/cm$^2$ or even higher rates.

The test cells 10 were balanced on the basis that milliamp-hrs capacity of zinc (based on 820 milliamp-hours per gram zinc) divided by the milliamp-hrs capacity of MnO$_2$ (based on 308 milliamp-hours per gram MnO$_2$) is slightly in excess of about 1.0.

The following example 1 illustrates the preparation of the test cells 10 employing the anode 20 comprising particulate zinc dispersed in gelled crosslinked polyvinylbenzyltrimethylammonium hydroxide (PVBTMAOH) and cathode 40 comprising particulate MnO$_2$ in admixture with linear polyvinylbenzyltrimethylammonium hydroxide (PVBTMAOH).

In example 1 an alternative method of forming the crosslinked polyvinylbenzyltrimethylammonium hydroxide (PVBTMAOH) in anode 20 and linear polyvinylbenzyltrimethylammonium hydroxide (PVBTMAOH) in the cathode 40 was employed. The alternative method consists of polymerizing vinylbenzyltrimethylammonium chloride (PVBTMACl) monomer to form polyvinylbenzyltrimethylammonium chloride (PVBTMACl) and then subjecting the PVBTMACL to ion exchange using an anionic exchange membrane to replace the chlorine with a hydroxyl group. The ion exchange results in the needed crosslinked polyvinylbenzyltrimethylammonium hydroxide (PVBTMAOH) in the anode or linear polyvinylbenzyltrimethylammonium hydroxide (PVBTMAOH) for the cathode.

EXAMPLE 1

A test cell 10 as shown in FIG. 2 is prepared with anode 20 comprising 0.5 grams particulate zinc 20b. The zinc anode 20 with gelled polyvinylbenzyltrimethylammonium hydroxide (PVBTMAOH) is prepared as follows. Holding block 30 was applied against insulating block 15 with block 15 on the bottom and block 30 on top as shown in FIG. 2. Particulate zinc 20b is poured into cavity 32 so that the zinc 20b forms a layer at the bottom of cavity 32 (at end 33). The cavity 32 is then filled with a monomer solution comprising VBTMACl (vinylbenzyltrimethylammonium chloride) monomer, water, initiator, and crosslinking agent. The monomer solution surrounds the particulate zinc layer at the base of the cavity (end 33). The remainder of the cavity 32, that is, above the zinc layer is filled with clear monomer solution.

In the specific test cell 10 (FIG. 2) the cavity 32 had a diameter of about 1.6 cm. Particulate zinc 20b was poured into cavity 32 in amount approximately equal to about ¼ g of zinc per square centimeter of cavity 32 diameter. Thus, the total weight of the particulate zinc 20b was 0.5 g. The cavity 32 had a length of about 7 mm, that is between the cavity outer end 33 and inner end 34. The zinc powder formed a layer at the bottom of the cavity 32 (at end 33) which had a thickness of about 1 mm, preferably between about 1 to 4 mm, that is, as measured from end 33 to interface 36. After polymerization and crosslinking of the monomer solution within cavity 32, the resulting gelled PVBTMACL polymer captures and holds the zinc particles 20b dispersed therein. A portion of clear gelled PVBTMACl polymer (i.e., portion of polymer devoid of zinc) extends between about 0.1 and 3 mm, preferably between about 2 to 3 mm above the zinc layer, that is, from interface 36 to inner end 34 of cavity 32. The cavity 32 had a diameter of ⅝ inches (1.59 cm). The cross-sectional area of cavity 32 was about 2 cm$^2$.

The composition of the monomer solution and procedure for carrying out the polymerization is as follows: The monomer solution comprised 54 wt. % VBTMACl and 45 wt. % water, with 1 mol % of N,N'-bismethyleneacrylamide (BMAAm) crosslinking agent added based on VBTMACl. An azo free radical initiator (0.4 ml per 10 g of monomer solution) consisting of a 4 wt. % aqueous solution of 2,2'-azobis (2-methylpropionamidine)dihydrochloride is also added.

After cavity 32 is filled with the monomer solution covering the layer of powdered zinc 20b at the bottom of the cavity, a Plexiglas cover is placed over the open end 34 of cavity 32 to keep oxygen out. The zinc powder can be an alloy of zinc (99.9 wt % zinc containing about 200 ppm indium).

The adjoined blocks 15 and 30 with the above monomer mixture within cavity 32 is placed in an oven and heated at about 50° C. for about 1 hour under a nitrogen atmosphere. The monomer polymerizes and crosslinks into a tacky, non flowable material forming a gelled zinc anode 20 comprising a layer of particulate zinc 20b at the base of a column of polymerized polyvinylbenzytrimethylammonium chloride (PVBTMACL).

The anode 20 (FIG. 2) comprising the zinc powder 20b and crosslinked polymer PVBTMACL is then subjected to ion exchange so that the chloride ion within the polymer is replaced with a hydroxyl ion. This is necessary because anode reaction in an alkaline cell requires the presence of hydroxyl ions, e.g., Zn+2OH$^-$=ZnO+H$_2$O. The ion exchange is accomplished by placing an anionic (negative ion) exchange membrane (Pall-RAI PAM201) from Pall-RAI Corporation over the open end of the cylindrical chamber 32 constructed of polypropylene, thereby covering the polymerized/crosslinked PVBTMACL within chamber 32. A second cylindrical chamber having an open end and a closed end is filled with an aqueous 7N potassium hydroxide solution. The open end of the second cylindrical chamber with aqueous potassium hydroxide therein is placed against the exposed side of the anion exchange membrane and the chambers clamped together with the ion exchange membrane therebetween. The Donnan exclusion properties of the membrane and the PVBTMACL polymer gel resists diffusion of potassium ions into the gel, while allowing free diffusion of the Cl$^-$ and OH$^-$ across the membrane. The Donnan exclusion properties of an ion exchange membrane is discussed in "Principles of Colloid and Surface Chemistry", Paul C. Hiemenz, Marcel Dekker, Inc. New York 1977, p. 145–149. The chloride ion (Cl$^-$) within the PVBTMACL polymer is gradually exchanged with hydroxyl ions (OH$^-$) from the potassium hydroxide solution within the second cylindrical chamber. The ion exchange process is carried out at ambient conditions and takes about one month to complete, that is, to convert the polymerized/crosslinked PVBTMACL polymer to crosslinked PVBTMAOH polymer. The duration of the OH$^-$/CL$^-$ ion exchange strongly affects the discharge properties of the zinc anode. The anode current density and the anode capacity per unit surface area, both increase with increasing ion exchange time until steady maxima values are reached after about one month's exchange.

The ion exchange period can be reduced to about 4 days by directly soaking the crosslinked PVBTMACL in the 7N KOH without the use of the ion exchange membrane. In this case, the ion exchange time required to maximize anode current and capacity is 5 days. It is believed that the maximum current and capacity values are reached when the crosslinked polyelectrolyte composition equilibrates with 7N KOH and that the same equilibrium is attained by either ion exchange process. After the polyelectrolyte equilibrates the polyvinybenzyltrimethylammonium hydroxide (PVBTMAOH) gel contained between about 0.5 and 2 moles excess KOH, typically 1.6 moles excess KOH per mole monomer unit of the polyelectrolyte polyvinybenzyltrimethylammonium hydroxide (PVBTMAOH). These values represent excess hydroxide, that is, $OH^-$ associated with $K^+$ ions that is in addition to the $OH^-$ associated with the cationic ammonium groups in the polymer. This concentration of KOH in the gel is consistent with the Donnan equilibrium equation. Thus, the polyelectrolyte PVBTMAOH gel can advantageously contain up to about 2 moles additional KOH per mole of the monomer unit of polyelectrolyte polyvinybenzyltrimethylammonium hydroxide (PVBTMAOH). In sum, the polyelectrolyte gel can contain between 0 and 2 moles additional KOH per mole of monomer unit of the polyvinybenzyltrimethylammonium hydroxide (PVBTMAOH), desirably between about 0.5 and 2 moles additional KOH per mole monomer unit of the polyelectrolyte (PVBTMAOH). The polyelectrolyte gel containing additional KOH results from adding excess KOH to the solution to which the PVBTMACL is exposed in order to form PVBTMAOH.

It is well known that passivation, in the form of an oxide film, primarily zinc oxide deposited on the zinc particles, hinders anode discharge. Such passivation is a principal mechanism that hinders electrochemical kinetics during discharge and ultimately the cell's capacity. Adding aqueous KOH to the polyelectrolyte gel increases electrolyte conductivity and tends to dissolve zinc oxide deposits thereby retarding anode passivation.

The resulting anode 20 comprising the polymerized/crosslinked polymer electrolyte of the invention with suspended particulate zinc therein is a non-flowable, tacky material having the feel of a rubbery material. There is a clear portion of the polymerized/crosslinked polymer electrolyte (i.e. portion without any zinc) anode interface 36 and inner end 34 of cavity 32. This portion functions as both electrolyte and anode/cathode separator.

The total anode mixture (between ends 33 and 34 shown in FIG. 2) comprising the particulate zinc with cross-linked PVBTMAOH polymer electrolyte within cavity 32 has the following composition. The completed total anode with crosslinked PVBTMAOH has a rubbery consistency.

Anode Composition with Polymer Electrolyte

| | Vol. % | Wt. % |
|---|---|---|
| Zinc particles[1] | 50.0 | 87.7 |
| Gelled crosslinked PVBTMAOH Polymer electrolyte[2] | 50.0 | 12.3 |
| Total | 100.0 | 100.0 |

Notes:
[1]Real density of zinc is 7.14 g/cm$^3$. Density of gelled PVBTMAOH is about 1.0 g/cm$^3$. Average particle size of zinc between about 30 and 350 micron. The zinc particles are an alloy comprising at least 99.9 wt. % zinc and less than 200 ppm indium. The zinc particles are of average particle diameter of about 300 microns.
[2]The polymer electrolyte is cross-linked PVBMAOH The cathode disk 40 (FIG. 2) is made as follows: A linear polymer polyvinylbenzyltrimethylammonium chloride (PVBTMACL) is made separately and then subjected to ion exchange so that the chloride ion within the polymer is replaced with a hydroxyl ion to form a linear polymer polyvinylbenzyltrimethylammonium hydroxide (PVBTMAOH). The linear PVBTMACL is made by first forming a monomer solution comprising VBTMACL monomer, water, and initiator (no cross-linking agent was added). The monomer solution comprised 55 wt. % VBTMACl and 45 wt. % water. An azo free radical initiator (0.4 ml per 10 g of monomer solution) consisted of a 4 wt. % aqueous solution of 2,2'-azobis-(2-methylpropionamidine) dihydrochloride is added. The monomer solution is heated at about 50° C. for about 1 hour to form a viscous, flowable, linear polymer solution (PVBTMACL). The polymer solution comprising linear PVBTMACL is then subjected to ion exchange so that the chloride ion within the polymer is replaced with a hydroxyl ion. This is accomplished by pouring the linear PVBTMACL solution into a cylindrical chamber having an open end and a closed end. An anion (negative ion) exchange membrane (Pall-RAI PAM20) from Pall-RAI Corp. is placed over the open end of the cylindrical chamber thereby covering the PVBTMACL solution. A second cylindrical chamber having an open end and a closed end is filled with an aqueous potassium hydroxide solution. The open end of the second cylindrical chamber with aqueous potassium hydroxide therein is placed against the exposed side of the anion exchange membrane, that is, so the ion exchange membrane is between the PVBTMACL solution and aqueous potassium hydroxide solution. The chloride ion within the PVBTMACL polymer is gradually exchanged with hydroxyl ions from the potassium hydroxide solution within the second cylindrical chamber. The ion exchange process is carried out at ambient conditions and took about one month to complete, that is, to convert the linear PVBTMACL polymer to linear PVBTMAOH polymer.

The cathode 40 (FIG. 2) is then prepared by mixing the linear PVBTMAOH with particulate $MnO_2$ (EMD) and graphite. The final cathode mixture had the consistency of a bread dough. The mixture is then compacted and shaped to form cathode disk 40. It was not found necessary to add binder since the PVBTMAOH acts as both electrolyte and binder.

The final cathode composition was as follows:
Cathode Composition

| | Wt. % |
|---|---|
| $MnO_2$ (EMD) | 63.5 |
| Graphite[2] (Mixture of expanded graphite and natural graphite) | 6.5 |

-continued

The final cathode composition was as follows:
Cathode Composition

| | Wt. % |
|---|---|
| Gelled PVBTMAOH Polymer electrolyte[3] (16.7 wt. % VBTMAOH monomer 83.3 wt. % $H_2O$) | 30.0 |
| Total | 100.0 |

Notes:
[1]The $MnO_2$ is equivalent to Trona D battery grade EMD from Kerr McGee Company. The $MnO_2$ (EMD) has a real density of 4.45 $g/cm^3$ and an average particle size between about 1 and 100 micron.
[2]The graphite was a 50—50 wt. % mixture of expanded graphite from the Timcal Group and natural graphite NdG-15 from Nacional de Graphite, Brazil. The natural and expanded graphite has a real density of about 2.25 $g/cm^3$.
[3]The polymer electrolyte is a straight chain polymer (not cross-linked) which has the consistency of a viscous flowable polymer. The straight chain polymer is water soluble so that it can be mixed better with the $MNO_2$ than can the crosslinked polymer, which is water swellable, but not water soluble and maintains a rubbery consistency. The cathode mixture comprising particulate $MnO_2$ and graphite is held together by the viscous flowable PVBTMAOH polymer which acts as a binder as well as electrolyte.

The cathode having the above composition has the consistency of a bread dough while the polymerized straight chain PVBTMAOH electrolyte polymer itself has the consistency of a flowable viscous material.

The cell 10 (FIG. 2) was balanced with an amount of $MnO_2$ in cathode 40 on the basis that milliamp-hrs capacity of zinc (based on 820 milliamp-hours per gram zinc) divided by the milliamp-hrs capacity of $MnO_2$ (based on 308 milliamp-hours per gram $MnO_2$) is slightly in excess of about 1.0. The thickness of the cathode disk 40 was about 3.5 mm. The anode/cathode interface area (cross-section area of cavity 32) was about 2 $cm^2$.

The cell 10 (FIG. 2) was discharged at a constant current drain of about 4 mAmp resulting in a current density of about 2 $mAmp/cm^2$ to a cut off voltage of about 0.95 volts. The actual capacity achieved was 568 mAmp-hrs. The actual specific capacity achieved for the $MnO_2$ was 320 mAmp-hrs/g (104% of the theoretical 1 electron $MnO_2$ capacity).

In the above described method (Example 1) of preparing the anode and cathode the vinylbenzyltrimethylammonium chloride (VBTMACL) is polymerized first to form polyvinylbenzyltrimethylammonium chloride (PVBTMACL) which is then subjected to ion exchange using an anionic ion exchange membrane in order to replace the chloride ion in the polymer with a hydroxyl ion to form polyvinylbenzyltrimethylammonium hydroxide (PVBTMAOH). Although an effective method of preparation, such ion exchange process is slow. It has been determined that the preferred method as described in the detailed description is faster and can be employed resulting in the same end product (PVTMAOH) by first converting the monomer vinylbenzyltrimethylammonium chloride (VBTMACL) to vinylbenzytrimethylammonium hydroxide (VBTMAOH) and then polymerizing the VBTMAOH monomer to PVBTMAOH. A second advantage of the preferred method is the control that it allows of the amount of KOH that can be added to the gel. The KOH level of the polyelectrolyte generated by the preferred method can be brought up to any desired level by adding the appropriate excess of KOH during the initial VBTMAOH synthesis or after polymerization.

This preferred method is given in the detailed description portion of the present application (preceding Example 1). It is a much faster method of producing the PVBTMAOH than the method employed in Example 1 and is therefore preferred. Additional details of the preferred method is given in the following Examples. The basic method employed therein for the first step involving ion-exchange of VBTMACL monomer to VBTMAOH monomer is, per se, similar to that described in U.S. Pat. No. 5,760,088. The next step of polymerizing the VBTMAOH, either to obtain a linear polymer PVBTMAOH or crosslinked polymer PVBTMAOH is similar to the methods described in U.S. Pat. No. 4,140,659.

The chemical formula for vinylbenzyltrimethylammonium hydroxide (VBTMAOH) monmoner is given in the following formula I. The chemical formula for vinylbenzyltrimethylammonium chloride (VBTMACL) is given in the formula II. The chemical formula for polyvinylbenzyltrimethylammonium hydroxide (PVBTMAOH) is given in formula III.

vinylbenzyltrimethylammonium chloride
(VBTMACL)

vinylbenzyltrimethylammonium hydroxide
(VBTMAOH)

polyvinylbenzyltrimethylammonium hydroxide
(PVBTMAOH)

Preferrred Method of Preparing the Polymer Electrolyte Polyvinylbenzyltrimethylammonium Hydroxide (PVBTMAOH) by First Converting the VBTMACl Monomer to VBTMAOH Monomer and then Polymerizing the VBTMAOH Monomer to PVBTMAOH Polymer

EXAMPLE A

Preparation of Ion-exchanged Monomer VBTMAOH from VBTMACl Monomer 100 g (0.472 moles) of vinylbenzyltrimethylammonium chloride (Aldrich Chemical Company) was dissolved with stirring in 5.00 g of anhydrous denatured ethyl alcohol and 20.00 g of deionized water.

Separately, 156.04 g of potassium hydroxide pellets (Fisher) were dissolved in 400 g of anhydrous denatured ethyl alcohol. The resulting solution was then filtered through a Buchner funnel equipped with a fritted disc (porosity of 10 to 20 $\mu$m). The filtrate was collected and made up to a volume of 1 liter in a volumetric flask with additional anhydrous denatured ethyl alcohol. The molarity of the potassium hydroxide solution was determined to be 2.260M by titration with aqueous hydrochloric acid using phenolphthalein indicator.

208.9 ml of the 2.260M potassium hydroxide solution (0.472 moles of potassium hydroxide) was then slowly added to the vinylbenzyltrimethylammonium chloride solution with stirring at ambient temperature, resulting in the precipitation of potassium chloride and the formation of vinylbenzyltrimethylammonium hydroxide (VBTMAOH). Stirring was continued at ambient temperature for an additional 3 hours, followed by cooling in an ice-bath for an additional hour. The potassium chloride was then filtered off from the solution using a Buchner funnel equipped with a fritted disc (porosity of 10 to 20 $\mu$m).

The solid material collected in the Buchner funnel was then washed twice with 15 g of cold ethyl alcohol and then dried at 55° C. to a constant weight of 32.65 g. This equates to 0.438 moles of potassium chloride and gives the degree of conversion of the chloride monomer=0.438/0.472× 100%=92.8% (assuming the collected solid is comprised solely of potassium chloride).

The filtrate was collected separately. 1009 of deionized water was added and the solution rotary evaporated at 55–60° C. under reduced pressure to remove the ethyl alcohol. After rotary evaporation the solution weight was adjusted to 200 g with additional deionized water to give a 50 wt. % aqueous solution of the ion-exchanged monomer (based on the original weight of the vinylbenzyltrimethylammonium chloride).

The ion-exchanged monomer, namely, vinylbenzyltrimethylammonium hydroxide (VBTMAOH) could be subsequently polymerized, e.g., with persulfate initiators (potassium persulfate as described in Example B), azo initiators (e.g., VA-057 from Wako) or by UV (as described in Example 5).

EXAMPLE B

Linear Polymerization of the Vinylbenzyltrimethylammoniumhydroxide (VBTMAOH) Monomer Which was Made by Ion Exchange in Example A Approximately 30 g of the ion exchanged monomer solution, namely the vinylbenzyltrimethylammonium hydroxide (VBTMAOH) as made in Example A was transferred to a glass vial equipped with a rubber septum. The solution was then purged with argon gas by bubbling argon through the solution for 15 minutes. 0.5 wt. %. of solid potassium persulfate was then added (based on the total solution weight), sonicated for 5 minutes in an ultrasonic bath, and then purged with argon gas for an additional 15 minutes. The capped vial containing the solution was then placed in an oven heated at 55° C. and kept there for 5 hrs to polymerize the monomer. This resulted in the formation of a highly viscous, tacky linear polymer (not cross linked) of polyvinylbenzyltrimethylammonium hydroxide (PVBTMAOH).

Optionally, aqueous KOH can be added to the monomer VBTMAOH solution before polymerization or to the polymer PVBTMAOH solution. The aqueous KOH, e.g. 7N KOH, can be added in amount so that either the monomer VBTMAOH solution or polymer PVBTMAOH solution contains between about 0 and 2 moles KOH, preferably, between about 0.5 and 2.0 moles KOH per monomer unit.

EXAMPLE C

Preparation of Cathode Material Using Linear Polymer (not Cross-Linked) of Polyvinylbenzyltrimethylammoniumhydroxide (PVBTMAOH) as Prepared From Example B $MnO_2$ (Kerr-McGee EMD) and graphite (NDG-15) were combined in the ratio of 9:1 by weight and mixed and ground in a mortar and pestle.

Separately, linear polymer PVBTMAOH (as prepared in Example B) was diluted with additional deionized water to give a 10 wt. %. aqueous solution (based on the original weight of the vinylbenzyl-trimethylammonium chloride).

The $MnO_2$/graphite mixture and the 10 wt. % PVBTMAOH polymer solution were combined in the ratio of 9:1 by weight and mixed and ground in a mortar pestle. Approximately 1.75 g of this material was then pressed onto a Ni mesh at 10,000 lbs in a die (1.77 cm diameter). A Ni tab was then spot-welded to the back of the cathode pellet. This was then assembled into a cell using a zinc foil anode, with the anode and cathode being separated with a viscous solution (25 wt. %) of the polymer. The cell could then be subsequently discharged.

EXAMPLE D

Formation of Anode 20 (FIG. 2) with Particulate Zinc Suspended at Bottom of Column of Polyvinylbenzyltrimethylanmonium Hydroxide (PVBTMAOH)

0.50 g of zinc powder can be added to cavity 32 (FIG. 2) having a diameter of about 1.6 cm. Then 0.78 g of the ion-exchanged monomer VBTMAOH solution (as described in Example A) 0.016 g of N,N'-methylenebisacrylamide (cross-linking agent) and 0.004 g of potassium persulfate were transferred to a glass vial equipped with a rubber-septum. The solution was then sonicated using an ultrasonic bath for 5 mins and then purged with argon gas for 15 minutes. Optionally, aqueous KOH, e.g. from a 7N KOH solution can be added to the ion exchanged VBTMAOH monomer solution at this stage. Aqueous KOH can be added in amount so that the ion exchanged solution contains between about 0 and 2 moles added KOH, preferably between about 0.5 and 2 moles KOH per mole of the ion exchanged monomer VBTMAOH.

The solution was then heat treated in an argon flushed oven at 55° C. for 1 hr to form a cross-linked PVBTMAOH polymer with layer of zinc powder 20b held suspended at the bottom thereof as shown and described with reference to FIG. 2.

EXAMPLE E

Formation of a Free-Standing Cross-Linked Polymer Film Separator From the Ion-Exchanged VBTMAOH Monomer. The Free-Standing Separator can be Used as Separator Between the Metallic Sheet of Zinc and Cathode (FIG. 1)

5.00 g of the ion-exchanged monomer solution (as described in Example A), 0.10 g of N,N'-methylenebisacrylamide (cross-linking agent) and 0.025 g of potassium persulfate were transferred to a glass vial equipped with a rubber septum. The solution was then sonicated using an ultrasonic bath for 5 mins and then purged with argon gas for 15 minutes.

The solution was spread on a PTFE sheet, the top surface covered with another PTFE sheet and then heat treated in an argon flushed oven at 60° C. for 1 hr to form a cross-linked film separator with a thickness of about 100 micron.

The solution could also be cured in a polyolefin mold equipped with a 800 $\mu$m thick cavity and heated in a similar manner. Subsequent disassembly of the mold gave a free-standing film separator (FIG. 1) of cross-linked PVBTMAOH material. The film separator can be used in place of the gelled polymer 35 shown between anode 20 and cathode 40 in FIG. 1.

EXAMPLE F

Coating a Zinc Sheet with VBTMAOH Monomer and Curing the Monomer with Ultraviolet Light to Produce a Cured PVBTMAOH Polymer Over Zinc Sheet. The Cured PVBTMAOH Coating Functions as Separator Between Anode and Cathode An alternative separator between a zinc sheet 20 (FIG. 1) and cathode 40 (FIG. 1) can be formed by coating the zinc sheet with a vinylbenzyltrimethylammonium hydroxide (VBTMAOH) monomer and then subjecting the monomer to ultraviolet light to cure it. The example shown here offers the advantage of rapid processing.

20.00 g of vinylbenzyltrimethylammonium chloride was dissolved in 1.009 of anhydrous denatured ethanol and 4.00 g of deionized water. 6.24 g of KOH pellets were dissolved separately in 34.00 g of anhydrous denatured ethanol. The two solutions were then combined and stirred at ambient temperature for 3 hours, cooled for an additional hour and then filtered. The solid was washed with two lots of 5.00 g of cold ethanol and the filtrate comprising vinylbenzyltrimethylammonium hydroxide (VBTMAOH) monomer was collected. 5.00 g of the VBRMAOH monomer filtrate was combined with 5.00 g of deionized water and 0.0679 g of Irgacure 2959 photoinitiator (Ciba Speciality Chemicals). This solution was then spread onto zinc foil and passed on a conveyor through a UV-curing unit (Fusion UV system) at a speed of 20 ft/min. The coated zinc foil was passed through the curing unit 4 times to cure the material.

The UV cured PVBTMAOH coating on the zinc foil can function as a separator between anode 20 and cathode 40 thereby replacing the gelled polymer 35 shown in FIG. 1.

The anode and cathode of the present invention has particular utility in the context of an overall battery shape that is flat in that a major portion of the battery housing comprises at least one substantially flat surface. The thickness of the battery can be small in comparison to the length of the battery. In particular the concept of the present invention is intended to extend to substantially flat batteries wherein a major portion of the battery housing comprises a flat polygonal surface. The invention thus extends to batteries having a polyhedric shape. The invention is also intended to extend to batteries wherein a major portion of the battery housing has a flat surface which is a parallelogram or to batteries wherein the overall shape is prismatic. The invention is also applicable to batteries wherein the anode and cathode layers are in spirally wound configuration with separator layer therebetween.

Thus, the invention is not intended to be limited to the specific embodiments herein described, but is better defined by the claims and equivalents thereof.

What is claimed is:

1. An alkaline cell comprising an anode and a cathode, and an electrolyte comprising an aqueous mixture comprising polyvinylbenzyltrimethylammonium hydroxide (PVBTMAOH).

2. The alkaline cell of claim 1 wherein said electrolyte further comprises potassium hydroxide.

3. The alkaline cell of claim 1 wherein said anode comprises zinc and said cathode comprises manganese dioxide.

4. The alkaline cell of claim 1 wherein said electrolyte comprises between about 0 and 2 moles potassium hydroxide per mole monomer unit of the polyvinylbenzyltrimethylammonium hydroxide (PVBTMAOH).

5. The alkaline cell of claim 1 wherein said electrolyte comprises between about 0.5 and 2 moles potassium hydroxide per mole monomer unit of the polyvinylbenzyltrimethylammonium hydroxide (PVBTMAOH).

6. The alkaline cell of claim 1 wherein said cell further comprises a separator comprising crosslinked polyvinylbenzyltrimethylammonium hydroxide (PVBTMAOH).

7. The alkaline cell of claim 1 wherein the anode comprises particulate zinc dispersed within an aqueous gel comprising crosslinked polyvinylbenzyltrimethylammonium hydroxide (PVBTMAOH).

8. The cell of claim 1 wherein the cathode comprises a mixture comprising manganese dioxide, graphite, and an aqueous mixture comprising linear polyvinylbenzyltrimethylammonium hydroxide (PVBTMAOH) and water.

9. The cell of claim 8 wherein the manganese dioxide comprises between about 60 and 86 percent by weight of the cathode.

10. The cell of claim 8 wherein the linear polyvinylbenzyltrimethylammonium hydroxide (PVBTMAOH) comprises between about 1 and 10 percent by weight of the cathode.

11. The cell of claim 8 wherein the graphite comprises between about 4 and 10 percent by weight of the cathode.

12. The cell of claim 1 wherein the anode is the shape of a slab comprising a pair of opposing flat parallel faces defining two opposing ends, wherein said slab has a continuous circumferential surface between said opposing ends, said circumferential surface defining the slab peripheral edge and thickness.

13. The cell of claim 1 wherein the cathode is the shape of a slab having a pair of opposing parallel flat faces defining two opposing ends, and said slab having a continuous circumferential surface between said opposing ends defining the slab peripheral edge and thickness.

14. The cell of claim 12 wherein one end of the anode has zinc particles therein dispersed within crosslinked polyvinylbenzyltrimethylammonium hydroxide (PVBTMAOH) and the opposing end is clear comprising crosslinked polyvinylbenzyltrimethylammonium hydroxide (PVBTMAOH) devoid of zinc.

15. The cell of claim 14 wherein the cell is assembled with the clear end of the anode juxtapositioned against an end of the cathode, said clear end of the anode functioning as an electrolyte permeable separator.

16. The cell of claim 14 wherein said clear end of the anode has a thickness between about 0.1 and 3 mm.

17. The cell of claim 14 wherein said one end of the anode comprising zinc particles has a thickness between about 2 and 5 mm.

18. The cell of claim 1 wherein said cell has the shape of a rectangular parallelepiped.

19. The cell of claim 3 wherein the zinc comprises between about 3.0 and 3.5 grams per cubic centimeter of total anode volume.

20. An alkaline cell comprising an anode comprising zinc and a cathode comprising manganese dioxide, and a separator comprising an aqueous mixture comprising crosslinked polyvinylbenzyltrimethylammonium hydroxide (PVBTMAOH) between said anode and cathode.

21. The alkaline cell of claim 20 wherein said separator comprises crosslinked polyvinylbenzyltrimethylammonium hydroxide (PVBTMAOH).

22. The cell of claim 20 wherein the cathode comprises an aqueous mixture comprising manganese dioxide, graphite, and linear polyvinylbenzyltrimethylammonium hydroxide (PVBTMAOH).

23. The cell of claim 20 wherein the manganese dioxide comprises between about 60 and 86 percent by weight of the cathode.

24. The cell of claim 22 wherein the linear polyvinylbenzyltrimethylammonium hydroxide (PVBTMAOH) comprises between about 1 and 10 percent by weight of the cathode.

25. The cell of claim 22 wherein the graphite comprises between about 4 and 10 percent by weight of the cathode.

26. The cell of claim 20 wherein said polyvinylbenzyltrimethylammonium hydroxide (PVBTMAOH) functions as electrolyte during cell discharge.

27. The cell of claim 20 wherein the anode is the shape of a slab comprising a pair of opposing parallel flat faces defining two opposing ends, and wherein said slab has a continuous circumferential surface between said opposing ends, said circumferential surface defining the slab peripheral edge and thickness.

28. The cell of claim 20 wherein the cathode is the shape of a slab having a pair of opposing parallel flat faces defining two opposing ends, and said slab having a continuous circumferential surface between said opposing ends defining the slab peripheral edge and thickness.

29. The cell of claim 28 wherein the cell is assembled with the anode juxtapositioned against an end of the cathode with said separator therebetween.

30. The cell of claim 20 wherein said anode comprises a sheet of zinc having a thickness between about 0.1 and 0.5 mm.

31. The cell of claim 20 wherein said cell has the shape of a rectangular parallelepiped.

32. The cell of claim 20 wherein the cell is discharged at a rate corresponding to a current density between about 1 and 50 milliAmp/$cm^2$ wherein the current density is based on the interface area between anode and cathode.

* * * * *